Patented Feb. 8, 1949

2,460,811

UNITED STATES PATENT OFFICE 2,460,811

PROCESS FOR PREPARING PELLETED IRON-OXIDE TYPE CATALYSTS

Elwyn P. Davies, Alameda, and Frank T. Eggertsen, Oakland, Calif., assignors to Shell Development Company, San Francisco, Calif., a corporation of Delaware No Drawing. Application August 26, 1944, Serial No. 551,421

3 Claims. (Cl. 252—259.2)

The present invention relates to processes for preparing catalytic material and pertains more particularly to improved methods for preparing a catalyst of low density.

It is found that catalysts of low density, i. e., those having a highly porous structure, are highly active for many catalytic conversions, such as dehydrogenation, for example, of butylenes to butadiene, etc. They also have the advantage, in many cases, of more specifically catalyzing the desired reaction. Various methods for forming such highly porous catalysts may be employed, but most of these have been found to be unsatisfactory for various reasons. Thus, catalytic pellets may be prepared by adding a finely divided combustible material, such as sawdust, carbon, etc., to a mixture of catalytic material, forming pellets from said mixture, and then burning out the combustible material. However, it is found that the pellets so formed often have poor mechanical strength, and in addition shrink considerably during the burning so that the expected increase in porosity is not obtained. Further, the catalytic activity of such pellets is not appreciably affected by whatever slight increase in porosity which may be so obtained.

It is therefore an object of the present invention to provide an improved method of preparing catalytic material of low density, which method is simple and economical.

It is another object of this invention to provide an improved process of preparing highly porous metal oxide catalyst of high catalytic activity.

It is a particular object of this invention to provide an improved method of forming highly porous pellets of catalytic material comprising mainly iron oxide.

Further objects and advantages of the present invention will be readily apparent from the following description.

It is found that low density of a finished extruded pellet can be obtained by incorporating a large amount of water in the mixtures from which the extruded pellets are formed. As a result, moist masses are obtained, which are moist powders or thick pastes prior to extrusion. The extrudate of these moist masses have sticky surfaces which cause pellets cut therefrom to stick together into large agglomerate masses. The improved method of preparing catalyst of low density and high activity comprises, according to the present invention, the steps of mixing catalytic material with sufficient water to form a moist mass, then extruding this moist mass under conditions causing rapid drying of the surface of the extruded material, cutting the surface-dried extrudate into suitable lengths to form pellets, and thereafter thoroughly drying the body of said pellets of catalytic material.

The present invention is applicable to the preparation of catalysts which are to be used in a fixed or stationary form, i. e., rigidly arranged in a reaction chamber, and which are in the form of small lumps or pieces having any suitable shape and relatively small dimensions, say $\frac{1}{16}$ to $\frac{3}{4}$ inch in length and $\frac{1}{16}$ to $\frac{3}{4}$ inch in diameter.

Catalytic materials may be formed into extruded pellets of low density, according to the present invention, for use in such catalytic processes, wherein a minimum of secondary reactions are desired. The catalysts so prepared are especially suitable for use in catalytic dehydrogenation, such as of butylenes to butadiene, ethyl benzene to styrene, etc., or in catalytic oxidation, catalytic hydrogenation, catalytic chlorination, catalytic amination, catalytic dehydration, etc.

As suitable catalytic materials, the metal oxides, mixtures thereof, and mixtures with minor amounts of other agents, such as promoters and the like, may be mentioned and include, for example, oxides of the iron group, i. e. iron, cobalt, and nickel, other heavy metals, such as copper, zinc, bismuth, thorium, etc., other elements, such as aluminum, silicon, magnesium, titanium, vanadium, potassium, calcium, chromium, manganese, molybdenum, tungsten, etc. The oxides may be formed from the hydroxides or other compounds, such as the carbonates, which are relatively easily decomposed into the oxides by heating. Also, other compounds of such metals, elements and the like may in some cases be used. Thus, the final form of the catalyst may comprise oxides, sulfides, metals in their elemental state, carbonates, chlorides, fluorides, sulfates, phosphates, arsenates, molybdates, thiomolybdates, tungstates, thiotungstates, borates, mixtures thereof, etc.

Further, in some cases, it may be desirable to employ carriers, such as pipe clay, meerschaum, bentonite, bauxite, permutites, majolica, chamotte, pumice, concrete, fuller's earth, etc. These materials may be admixed with the catalytic materials or their compounds to form the extrudable moist mass. Also, these materials alone, or a portion of the catalytic materials, such as alumina, silica gel, etc., may be formed into dried pellets by our process and thereafter impregnated with catalytic agents or promoters.

In carrying out the present invention, the catalytic materials and/or carriers therefor, in the form of colloids, semi-colloids, or coarse dispersions, are mixed with sufficient water to form a moist mass, i. e., a moist powder or thick paste which can be extruded through a perforated die plate. In the range of desired water contents, such moist masses form sticky extrudates. Pellets, formed by cutting this extrudate into suitable lengths, are normally soft, easily deformed, and readily stick together into unusable agglomerates. The minimum amount of water content of the moist mass which causes sticking of extrudated pellets formed therefrom, and the maximum amount of water, which can be used to give an extrudable moist mass, depend in part on the state of division of the material. Thus, colloidal dispersions can hold more water without yielding sticky extrudates than dispersions of semi-colloidal or less finely-divided solid materials. Further, the nature of the ingredients of the moist mass determine the ease of extrusion, i. e. the extrudability. Thus, moist masses of some materials can only be extruded with great difficulty or not at all. Likewise, the amounts of water in the moist mass which can be used to yield an extrudate that is sticky and yet sufficiently stable to hold its shape temporarily depends in part on the nature of the ingredients employed. For example, with iron-group metal oxides, such as iron oxide, the preferred water content is 20% to 35%, especially 25-30%, although water contents of 45% and 60% have advantageously been used. In general, water contents are used in the range between the minimum which causes sticking of the extruded pellets and the maximum which may be used to obtain an extrudable material capable after extrusion of holding its shape at least for a short while (e. g., 1/20 to 5 seconds) when not exposed to externally applied deformation pressures. The maximum water content is, in other words, the highest at which a temporarily stable extrudate can be obtained. In contrast to the stickiness of extrudates from the moist mass (i. e., moist powders or thick pastes), of the present invention, a relatively dry mass or powder, i. e. of low water content, ordinarily forms non-sticking extrudates.

There may also be incorporated into the moist mass small amounts of extrusion aids. Thus, for example, 0.1 to .2% of such materials as stearic acid, hydrogenated cotton seed oil, tannic acid, extracts containing tannic acids or tannins, e. g. Quebracho extract, etc., may be added to modify the rheological properties of the mixture to aid in the extrusion. Likewise, the moist mass may contain materials which increase the strength of the partially-dried or uncalcined pellets. Especially effective for increasing the strength of uncalcined pellets comprising mainly iron oxide is ferric sulfate, which may be added, preferably along with about an equimolecular amount of potassium hydroxide, in an amount of about 1 to 5% by weight of the final calcined pellet.

The extrusion of the moist mass of catalytic material may be carried out with any suitable apparatus and in any suitable manner, as long as the conditions are maintained for causing a rapid drying of the surface of the extruded material. Athough many specific extrusion machines are suitable for use in the present invention, those illustrated in United States Patents 855,379 and 2,341,213 may be mentioned as examples. In general, the moist mass is extruded through a perforated die-plate or stator member by the action of a rotary member, such as a continuous worm or auger which bears against the moist mass and forces it through the perforations. The extruded string or ribbon issuing from the perforations is subsequently cut into suitable lengths to form pellets by means of a cutting member, such as a rotating blade or wire. The extrudate may be delivered in various suitable shapes which are obtainable by extrusion and which include round, semicircular, square, rectangular and other cross-sectional forms, dependent upon the shape of the perforations in the die-plate or stator member of the extrusion machine.

The rapid drying of the surface of the extrudate (i. e., without substantial drying of the body of the extrudate) is accomplished most easily by directing a stream of gas against the extrudate as it emerges from the perforations in the die-plate of the extrusion apparatus. The gas is preferably hot, i. e., at a temperature around the boiling point of water, for example, 80°–120° C. The gas may be air, nitrogen, flue or exhaust gas, and the like, and should be a gas which does not disadvantageously affect the catalytic material. The amount of gas and the temperature thereof necessary to dry the surface of the extrudate sufficiently before it is cut into pellets is dependent upon the water content of the extrudate, the nature of the catalytic material insofar as it relates to the stickiness of the extrudate, the rate of extrusion, the rate of cutting the extrudate into pellets, etc. In general, an amount of gas is passed over the surface of the extrudate to cause said surfaces to become sufficiently dry before the extrudate is cut into pellets so that the pellets do not stick together or lose their individual shape. In other words, the surfaces of the extrudate are dried rapidly enough (e. g., in 1/20 to 5 seconds) to set the outer portion thereof into a non-sticking state before the pellets are cut therefrom.

Then, the surface-dried extrudate is cut into suitable lengths to form pellets of the desired length. Since the surfaces of the pellets are at least partially dried, the pellets do not stick together and may be handled in the same manner as pellets prepared from normal extrusion of masses of low water content. As noted hereinabove, any suitable means, such as rotating knife blades, wires, etc., for cutting the surface-dried extrudate into pellets may be used. Preferably, a single narrow rotating blade, or similar cutting device, which least obstructs the passage of air over the extrudate, is employed and may be attached to the shaft of the rotating auger which drives the moist mass through the perforations in the die-plate. As pointed out above, the rate of cutting as well as extrusion is interdependent with the water content of the extrudate, the rate and temperature of the drying gas, etc.

The body of the pellets are then further dried and treated to convert the catalytic material into its proper activated form. Such treatment generally comprises calcination at relatively high temperatures for a sufficient time to develop the catalytic properties and to increase the strength of the pellets. Such conventional calcination is usually applied to metal oxide catalysts. The temperatures used in the calcination depend upon the chemical and physical nature of the catalytic material, the nature of promoters and carriers present, etc. For catalysts containing a major proportion of iron oxide, calcination temperatures may be, for example, of the order of 700°–1000° C. or more and preferably 800°–950° C., for periods of 2–6 hours, more or less.

It is desirable to dry before calcining. Best results are obtained when the water content is reduced to 10% or lower before calcining. Drying should be rapid. High drying temperatures of the order of 150° to 300° C. may be used. A tunnel drier in which the pellets are carried through a hot zone on a belt or apron conveyor is generally most suitable. There must be sufficient circulation of hot gases over the wet pellets in the drier as well as in the calcining kiln to avoid condensation on cool pellets, which condensation would make the pellets sticky.

The pellets of active catalytic material are then usually screened for size and the over and under size material ground and recycled.

As illustrative of the process of the present invention, a catalyst was prepared in the following manner: Dry finely-divided iron oxide ($Fe_2O_3$) of a pigment type and chromium oxide ($Cr_2O_3$) were thoroughly mixed and then added to an aqueous solution of potassium carbonate to form a moist mass having a solid content consisting of 5% $Cr_2O_3$, 4% $K_2CO_3$, 0.3% tannic acid and the remainder $Fe_2O_3$. The mass had a water content of 28.9% based on the metal oxides and was extruded in an extrusion machine having a 2¾ inch diameter auger driven at 36 R. P. M., a die-plate containing 82 $\frac{3}{16}$-inch holes, and a single blade cutter attached to the auger shaft and adapted to cut the extrudate into pellets of about $\frac{3}{16}$ of an inch in length. The angle between the cutter and the tip of the auger was adjusted so that the extrudate dried about 1–1.5 seconds prior to its being cut into pellets. A hot air blast was directed against the die-plate to dry the surfaces of the extrudates. The flow of air was around 40 cu. ft. per minute, the temperature of the air was about 120° C. and the maximum velocity of the air stream was about 150 feet per second. The pellets cut from the surface-dried extrudate did not stick together while the hot air stream was flowing but readily stuck together when the air blast was discontinued. The pellets so formed were dried and calcined at 930° C. for 12 hours. They were then sized and the proper size pellets measured for bulk density. This measurement is performed by repeated additions of catalyst pellets to a 100 cc. graduate, followed by tapping until the catalyst level remains at the 100 cc. mark, after which the sample is weighed. The bulk density thus obtained for the catalyst prepared in the above example was 1.08 g./cc. This catalyst gave high conversion efficiencies for dehydrogenation of butylene to butadiene.

As further illustrative of the present process, a series of experiments were carried out with moist masses of iron oxide ($Fe_2O_3$), containing 4% (by weight of solids) of $K_2CO_3$ and varying water contents. The moist masses were extruded in an extrusion device having a 1⅝ inch diameter auger, a die-plate having 24 $\frac{3}{16}$ inch openings, and a cutter attached to the auger shaft and adapted to cut $\frac{3}{16}$ inch long pellets from the extrudate. In order to prevent sticking of the pellets as they were cut off, a blast of hot air was played on the face of the die-plate. The surface-dried pellets so formed were oven-dried and calcined for 2 hours at 900° C. The resulting catalytically active pellets were measured for bulk density as well as pellet density (i. e., the actual density of the individual pellets as measured by mercury displacement and weighing) and the crushing strength, which last is determined by measuring the force necessary to crush a pellet $\frac{3}{16}$ inch or more in length placed crosswise between two metal surfaces $\frac{3}{16}$ inch wide. The results of these measurements are shown in the following table:

| Catalyst No. | Per Cent by wt. $H_2O$ (based on metal oxides) | Bulk Density, g./cc. | Pellet Density, g./cc. | Crushing Strength, lbs. |
|---|---|---|---|---|
| 1 | 31 | 0.96 | 1.98 | 16.9 |
| 2 | 31 | 0.98 | | 14.2 |
| 3[1] | 31 | 0.97 | | 10.5 |
| 4 | 36 | 0.89 | 1.81 | 11.7 |
| 5 | 41 | 0.82 | 1.64 | 11.7 |
| 6[2] | 41 | 0.87 | 1.66 | 14.5 |
| 7 | 46 | 0.80 | 1.59 | 14.9 |
| 8 | 51 | 0.81 | 1.52 | 12.8 |
| 9 | 56 | 0.75 | 1.64 | 10.6 |
| 10[3] | 60 | 0.85 | 1.50 | 9.8 |

[1] Contained 5% $Cr_2O_3$ in addition to other components.
[2] 0.3% tannic acid in mixture.
[3] No $K_2CO_3$ in mixture.

We claim as our invention:

1. The process for preparing iron-oxide-type catalysts in the form of pellets affording a high selectivity of catalytic action which comprises mixing the catalytic material consisting mainly of powdered iron oxide with water, the amount of water being sufficient to form a moist mass which upon normal extrusion forms pellets which stick together upon contact but are sufficiently stable to hold their extruded shape temporarily, extruding said moist mass while rapidly drying the surface of the extrudate to below the point of stickiness, thereby to produce an extrudate containing a greater concentration of water in the interior than on the surface, cutting the surface-dried extrudate still containing substantially the original amount of water within five seconds of its formation into lengths suitable for catalyst pellets, and then subsequently drying the cut pellets to remove the remaining main portion of water.

2. The process for preparing iron-oxide-type catalysts in the form of pellets affording a high selectivity of catalytic action which comprises mixing the catalytic material consisting mainly of powdered iron oxide with water, the amount of water being between 20% and 60% by weight of the mass and being sufficient to form a moist mass which upon normal extrusion forms pellets which stick together upon contact but are sufficiently stable to hold their extruded shape temporarily, extruding said moist mass while rapidly drying the surface of the extrudate to below the point of stickiness, thereby to produce an extrudate containing a greater concentration of water in the interior than on the surface, cutting the surface-dried extrudate still containing substantially the original amount of water within five seconds of its formation into lengths suitable for catalyst pellets, and then subsequently drying the cut pellets to remove the remaining main portion of water.

3. The process for preparing iron-oxide-type catalysts in the form of pellets affording a high selectivity of catalytic action which comprises mixing the catalytic material consisting mainly of powdered iron oxide with water, the amount of water being sufficient to form a moist mass which upon normal extrusion forms pellets which stick together upon contact but are sufficient stable to hold their extruded shape temporarily, extruding said moist mass while passing over the extrudate a hot gas which is nondetrimental to the catalyst thereby to rapidly dry the surface of the extrudate to below the point of stickiness and to produce an extrudate containing a greater concentration of water in the interior than on the surface, cutting the surface-dried extrudate still containing substantially the original amount of water within five seconds of its formation into lengths suitable for catalyst pellets, and then subsequently drying the cut pellets to remove the remaining main portion of water.

ELWYN P. DAVIES.
FRANK T. EGGERTSEN.

REFERENCES CITED

The following references are of record in the file of this patent:

UNITED STATES PATENTS

| Number | Name | Date |
|---|---|---|
| 1,115,776 | Bosch et al. | Nov. ?, 1914 |
| 1,317,157 | Duffee et al. | Sept. 30, 1919 |
| 1,483,412 | Clancy | Feb. 12, 1924 |
| 1,744,610 | Boykin | Jan. 21, 1930 |
| 1,844,963 | Larson | Feb. 16, 1932 |
| 2,032,624 | Lyons | Mar. 3, 1936 |
| 2,078,945 | Houdry | May 4, 1937 |
| 2,079,854 | Hartshorne | May 11, 1937 |
| 2,265,682 | Bennett | Dec. 9, 1941 |
| 2,282,922 | Ahlbery et al. | May 12, 1942 |
| 2,293,174 | Bates et al. | May 19, 1942 |
| 2,336,734 | Jellinek | Dec. 14, 1943 |
| 2,365,094 | Michael et al. | Dec. 12, 1944 |

FOREIGN PATENTS

| Number | Country | Date |
|---|---|---|
| 424,478 | Great Britain | Feb. 21, 1935 |
| 510,110 | Great Britain | July 27, 1939 |